US011768217B2

(12) United States Patent
Ohashi

(10) Patent No.: US 11,768,217 B2
(45) Date of Patent: Sep. 26, 2023

(54) SENSOR APPARATUS, INFORMATION PROCESSING APPARATUS, METHOD OF OUTPUTTING MEASUREMENT DATA WITH SETTINGS, INFORMATION PROCESSING METHOD, PROGRAM, AND DATA STRUCTURE OF MEASUREMENT DATA WITH SETTINGS

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 218 days.

(21) Appl. No.: 17/285,703

(22) PCT Filed: Oct. 29, 2018

(86) PCT No.: PCT/JP2018/040122
§ 371 (c)(1),
(2) Date: Apr. 15, 2021

(87) PCT Pub. No.: WO2020/089970
PCT Pub. Date: May 7, 2020

(65) Prior Publication Data
US 2021/0341507 A1    Nov. 4, 2021

(51) Int. Cl.
*G01P 1/12*    (2006.01)
*G01C 9/00*    (2006.01)
(Continued)

(52) U.S. Cl.
CPC .................. *G01P 1/12* (2013.01); *G01C 9/00* (2013.01); *G01P 3/44* (2013.01); *G01P 3/50* (2013.01)

(58) Field of Classification Search
CPC ..... G01P 1/12; G01P 3/44; G01P 3/50; G01C 9/00
See application file for complete search history.

(56) References Cited

U.S. PATENT DOCUMENTS

| 7,373,403 B2 | 5/2008 | Kroboth |
| 8,998,717 B2 * | 4/2015 | Parke .................... G06V 40/23 |
| | | 473/409 |

(Continued)

FOREIGN PATENT DOCUMENTS

| JP | 2004086898 A | 3/2004 |
| JP | 2007156779 A | 6/2007 |
| JP | 2011075505 A | 4/2011 |

OTHER PUBLICATIONS

International Preliminary Report on Patentability and Written Opinion for corresponding PCT Application No. PCT/JP2018/040122, 12 pages, dated May 14, 2021.

(Continued)

*Primary Examiner* — Elias Desta
(74) *Attorney, Agent, or Firm* — Matthew B. Dernier, Esq.

(57) ABSTRACT

A measurement data acquisition section acquires the measurement data indicating at least one from among the position, the orientation, the velocity, the acceleration, the angular velocity, and the angular acceleration measured by the sensor. A measurement-data-with-settings generation section generates measurement data with settings including the measurement data and coordinate system setting data indicating settings for a coordinate system used for expressing at least one from among the position, the orientation, the velocity, the acceleration, the angular velocity, and the angular acceleration indicated by the measurement data. A (Continued)

measurement-data-with-settings output section outputs the measurement data with settings.

6 Claims, 6 Drawing Sheets

(51) Int. Cl.
*G01P 3/44* (2006.01)
*G01P 3/50* (2006.01)

(56) References Cited

U.S. PATENT DOCUMENTS

| | | |
|---|---|---|
| 9,229,540 B2 * | 1/2016 | Mandella ................. G06F 3/011 |
| 10,124,230 B2 * | 11/2018 | Thornbrue .......... G06F 2218/08 |
| 2004/0037230 A1 | 2/2004 | Kroboth |
| 2007/0282944 A1 | 12/2007 | Odaka |

OTHER PUBLICATIONS

Notice of Reasons for Refusal for corresponding JP Application No. 2020-5546182, 6 pages, dated Dec. 21, 2021.

International Search Report for corresponding PCT Application No. PCT/JP2018/040122, 4 pages, dated Jan. 29, 2019.

* cited by examiner

FIG.7

```
coord::CoordSystem cs_in = coord::CoordSystem(coord::System::a1,
          coord::UnitLength::a2,
          coord::Axis::a3,
          coord::Axis::a4,
          coord::Axis::a5);                              ···(1)

coord::Vector3 p_in = cs_in.Vector3(px, py, pz);        ···(2)

coord::Quaternion q_in = cs_in.Quaternion(qx, qy, qz, qw);
                                                         ···(3)

coord::CoordSystem cs_out = coord::CoordSystem(coord::System::b1,
          coord::UnitLength::b2,
          coord::Axis::b3,
          coord::Axis::b4,
          coord::Axis::b5);                              ···(4)

coord::Vector3 p_out = p_in.convert(cs_out);            ···(5)

coord::Quaternion q_out = q_in.convert(cs_out);         ···(6)
```

FIG.9

|  | QUATERNION q | from_axis |
|---|---|---|
| (1) | (0,0.33,0.55,0.77) | (X_MINUS,Y_PLUS,Z_MINUS) |
| (2) | (0.33,0,0.55,-0.77) | (X_MINUS,Y_PLUS,Z_MINUS) |
| (3) | (0.33,0,0.55,-0.77) | (X_MINUS,X_PLUS,Z_MINUS) |
| (4) | (0.55,0,0.33,0.77) | (X_MINUS,X_PLUS,Z_MINUS) |
| (5) | (0.55,0,0.33,0.77) | (X_MINUS,X_PLUS,X_MINUS) |
| (6) | (-0.55,0,0.33,-0.77) | (X_MINUS,X_PLUS,X_MINUS) |

SENSOR APPARATUS, INFORMATION PROCESSING APPARATUS, METHOD OF OUTPUTTING MEASUREMENT DATA WITH SETTINGS, INFORMATION PROCESSING METHOD, PROGRAM, AND DATA STRUCTURE OF MEASUREMENT DATA WITH SETTINGS

TECHNICAL FIELD

The present invention relates to a sensor apparatus, an information processing apparatus, a method of outputting measurement data with settings, an information processing method, a program, and a data structure of measurement data with settings.

BACKGROUND ART

In recent years, attention has been drawn to the technologies of the IoT (Internet of Things) by which various devices connected to the Internet exchange information therebetween.

SUMMARY

Technical Problem

Using the IoT technologies makes it possible conceivably, for example, to perform operations such as those of identifying an overall arrangement of multiple diverse sensors, and relative positions and relative orientations of the sensors on the basis of measurement data collected from these sensors.

However, specifications of such measurement data are not standardized. Thus, settings are not uniform for coordinate systems in which the positions and the orientations indicated by the measurement data are identified, such as whether a given coordinate system is a right-handed system or a left-handed system, what a positive direction of the coordinate system is, and what a unit of length of the coordinate system is. Further, these coordinate system settings are not indicated by the measurement data.

For this reason, in carrying out operations using the measurement data output from multiple diverse sensors, it is necessary for users to take time and trouble to reference specifications or other relevant documents to check the settings for the coordinate system for the measurement data.

The present invention has been made in view of the above circumstances. An object of the invention is therefore to provide a sensor apparatus, an information processing apparatus, a method of outputting measurement data with settings, an information processing method, a program, and a data structure of measurement data with settings for allowing a user easily to know settings for a coordinate system for measurement data indicative of at least one from among a position, an orientation, a velocity, an acceleration, an angular velocity, and an angular acceleration measured by a sensor.

Solution to Problem

In solving the above problem and according to the present invention, there is provided a sensor apparatus including: a measurement data acquisition section configured to acquire measurement data indicating at least one from among a position, an orientation, a velocity, an acceleration, an angular velocity, and an angular acceleration measured by a sensor; a generation section configured to generate measurement data with settings including the measurement data and coordinate system setting data indicating settings for a coordinate system used for expressing at least one from among the position, the orientation, the velocity, the acceleration, the angular velocity, and an angular acceleration indicated by the measurement data; and an output section configured to output the measurement data with settings.

In one mode of the present invention, the coordinate system setting data includes at least one of three items of data, one item of data indicating whether the coordinate system is a right-handed system or a left-handed system, another item of data indicating a front direction, the other item of data indicating a unit of length.

In this mode, the item of data indicating the front direction may include data indicating an axis direction to which the front direction corresponds, data indicating an axis direction to which an upward direction corresponds, data indicating an axis direction to which a rightward direction relative to the front direction corresponds, data indicating an axis direction to which a direction of gravity corresponds, or data indicating an axis direction to which a point of compass corresponds.

According to the present invention, there is provided an information processing apparatus including: a measurement-data-with-settings acquisition section configured to acquire measurement data with settings output from a sensor apparatus that includes a measurement data acquisition section configured to acquire measurement data indicating at least one from among a position, an orientation, a velocity, an acceleration, an angular velocity, and an angular acceleration measured by a sensor, a generation section configured to generate the measurement data with settings including the measurement data and coordinate system setting data indicating settings for a first coordinate system used for expressing at least one from among the position, the orientation, the velocity, the acceleration, the angular velocity, and the angular acceleration indicated by the measurement data, and an output section configured to output the measurement data with settings; and a coordinate conversion section configured such that, on a basis of the settings for the first coordinate system indicated by the coordinate system setting data included in the measurement data with settings and settings for a given second coordinate system, the coordinate conversion section converts an expression of at least one from among the position, the orientation, the velocity, the acceleration, the angular velocity, and the angular acceleration indicated by the measurement data included in the measurement data with settings, into an expression in the second coordinate system.

In one mode of the present invention, the coordinate conversion section performs a process of switching axes and a process of inverting a sign of each of the axes multiple times so as to convert an expression of at least one from among the position, the orientation, the velocity, the acceleration, the angular velocity, and the angular acceleration indicated by the measurement data included in the measurement data with settings, into an expression in the second coordinate system.

According the present invention, there is provided another information processing apparatus including: a first measurement-data-with-settings acquisition section configured to acquire first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings; a second measurement-data-with-settings acquisition section configured to acquire second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and a coordinate conversion section configured such that, on a basis of the settings for the first coordinate system indicated by the first coordinate system setting data included in the first measurement data with settings and the settings for the second coordinate system indicated by the second coordinate system setting data included in the second measurement data with settings, the coordinate conversion section converts an expression of at least one from among the position, the orientation, the velocity, the acceleration, the angular velocity, and the angular acceleration indicated by the first measurement data included in the first measurement data with settings, into an expression in the second coordinate system.

In one mode of the present invention, the coordinate conversion section performs a process of switching axes and a process of inverting a sign of each of the axes multiple times so as to convert an expression of at least one from among the position, the orientation, the velocity, the acceleration, the angular velocity, and the angular acceleration indicated by the first measurement data included in the first measurement data with settings, into an expression in the second coordinate system.

According to the present invention, there is provided a method of outputting measurement data with settings, the method including: a step of acquiring measurement data indicating at least one from among a position, an orientation, a velocity, an acceleration, an angular velocity, and an angular acceleration measured by a sensor; a step of generating measurement data with settings including the measurement data and coordinate system setting data indicating settings for a coordinate system used for expressing at least one from among the position, the orientation, the velocity, the acceleration, the angular velocity, and the angular acceleration indicated by the measurement data; and a step of outputting the measurement data with settings.

According to the present invention, there is provided an information processing method including: a step of acquiring measurement data with settings output from a sensor apparatus that includes a measurement data acquisition section configured to acquire measurement data indicating at least one from among a position, an orientation, a velocity, an acceleration, an angular velocity, and an angular acceleration measured by a sensor, a generation section configured to generate the measurement data with settings including the measurement data and coordinate system setting data indicating settings for a first coordinate system used for expressing at least one from among the position, the orientation, the velocity, the acceleration, the angular velocity, and the angular acceleration indicated by the measurement data, and an output section configured to output the measurement data with settings; and a step of, on a basis of the settings for the first coordinate system indicated by the coordinate system setting data included in the measurement data with settings and settings for a given second coordinate system, converting an expression of at least one from among the position, the orientation, the velocity, the acceleration, the angular velocity, and the angular acceleration indicated by the measurement data included in the measurement data with settings, into an expression in the second coordinate system.

According to the present invention, there is provided another information processing method including: a step of acquiring first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings; a step of acquiring second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and a step of, on a basis of the settings for the first coordinate system indicated by the first coordinate system setting data included in the first measurement data with settings and the settings for the second coordinate system indicated by the second coordinate system setting data included in the second measurement data with settings, converting an expression of at least one from among the position, the orientation, the velocity, the acceleration, the angular velocity, and the angular acceleration indicated by the first measurement data included in the first measurement data with settings, into an expression in the second coordinate system.

According to the present invention, there is provided a program for causing a computer to perform: a procedure of acquiring measurement data indicating at least one from among a position, an orientation, a velocity, an acceleration, an angular velocity, and an angular acceleration measured by a sensor; a procedure of generating measurement data with settings including the measurement data and coordinate system setting data indicating settings for a coordinate system used for expressing at least one from among the position, the orientation, the velocity, the acceleration, the angular velocity, and the angular acceleration indicated by the measurement data; and a procedure of outputting the measurement data with settings.

According to the present invention, there is provided another program for causing a computer to perform: a procedure of acquiring measurement data with settings output from a sensor apparatus that includes a measurement data acquisition section configured to acquire measurement data indicating at least one from among a position, an orientation, a velocity, an acceleration, an angular velocity, and an angular acceleration measured by a sensor, a generation section configured to generate the measurement data with settings including the measurement data and coordinate system setting data indicating settings for a first coordinate system used for expressing at least one from among the position, the orientation, the velocity, the acceleration, the angular velocity, and the angular acceleration indicated by the measurement data, and an output section configured to output the measurement data with settings; and a procedure of, on a basis of the settings for the first coordinate system indicated by the coordinate system setting data included in the measurement data with settings and settings for a given second coordinate system, converting an expression of at least one from among the position, the orientation, the velocity, the acceleration, the angular velocity, and the angular acceleration indicated by the measurement data included in the measurement data with settings, into an expression in the second coordinate system.

According to the present invention, there is provided a further program for causing a computer to perform: a procedure of acquiring first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings; a procedure of acquiring second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and a procedure of, on a basis of the settings for the first coordinate system indicated by the first coordinate system setting data included in the first measurement data with settings and the settings for the second coordinate system indicated by the second coordinate system setting data included in the second measurement data with settings, converting an expression of at least one from among the position, the orientation, the velocity, the acceleration, the angular velocity, and the angular acceleration indicated by the first measurement data included in the first measurement data with settings, into an expression in the second coordinate system.

According to the present invention, there is provided a data structure of measurement data with settings, including: measurement data indicating at least one from among a position, an orientation, a velocity, an acceleration, an angular velocity, and an angular acceleration measured by a sensor; and coordinate system setting data indicating settings for a coordinate system used for expressing at least one from among the position, the orientation, the velocity, the acceleration, the angular velocity, and the angular acceleration indicated by the measurement data.

BRIEF DESCRIPTION OF DRAWINGS

FIG. 7 is a view depicting a typical source code of a program performed by the measurement data collection apparatus according to the embodiment of the present invention.

FIG. 9 is an explanatory view explaining a specific example of the processing depicted in FIG. 8.

DESCRIPTION OF EMBODIMENT

Figure 1:
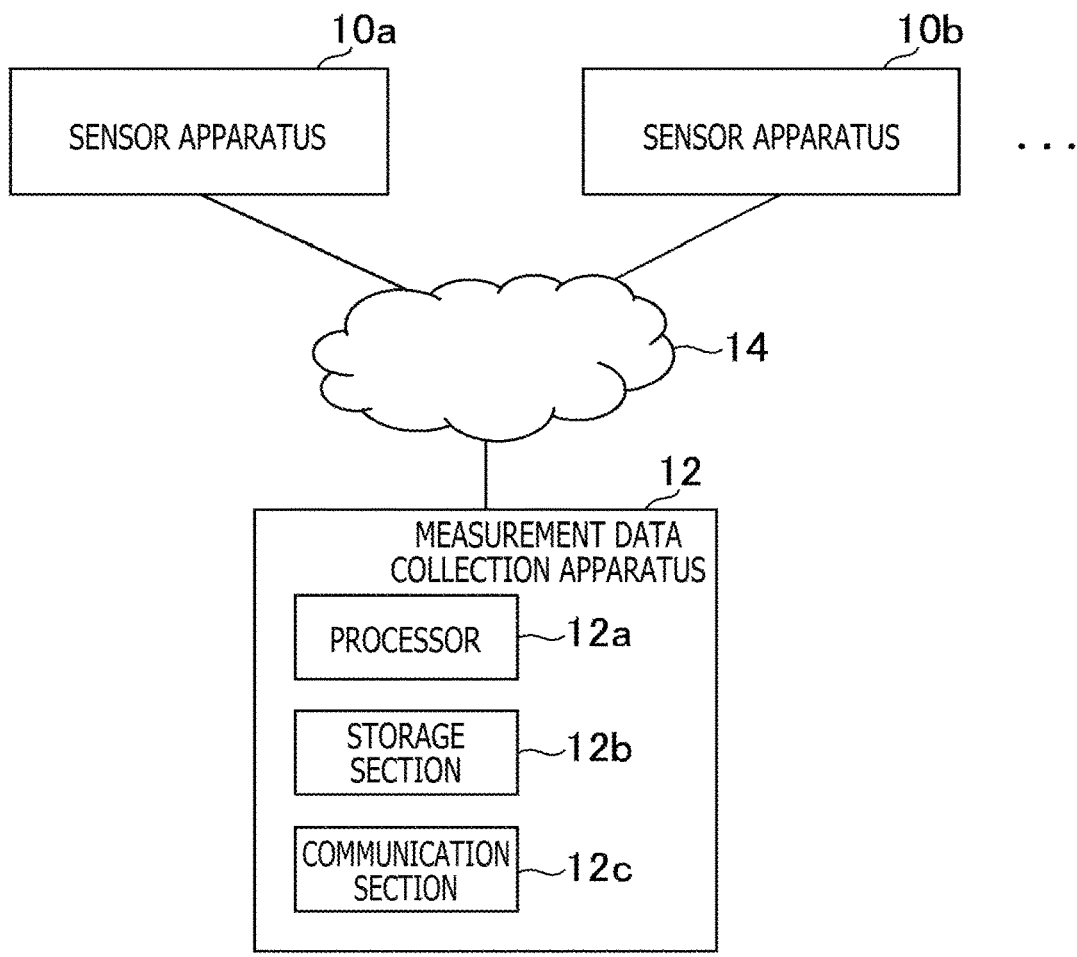
FIG. 1 is a view depicting an example of a computer network according to an embodiment of the present invention.
Figure 2:
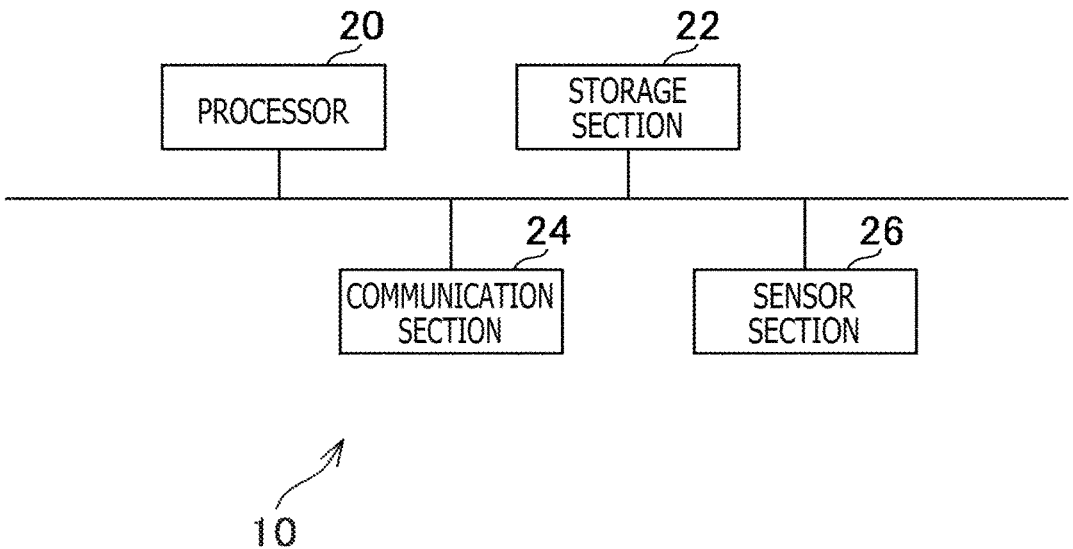
FIG. 2 is a view depicting a typical configuration of a sensor apparatus according to the embodiment of the present invention.

FIG. 1 is a view depicting an example of a computer network 14 according to an embodiment of the present invention. FIG. 2 is a view depicting a typical configuration of a sensor apparatus 10 according to the embodiment of the present invention.

As depicted in FIG. 1, the computer network 14 such as the Internet according to the present embodiment is connected with multiple sensor apparatuses 10 including sensor apparatuses 10a and 10b and with a measurement data collection apparatus 12. Thus, the sensor apparatuses 10 and the measurement data collection apparatus 12 can communicate with one another via the computer network 14.

The sensor apparatus 10 in the present embodiment is a device that tracks at least one from among a position, an orientation, a velocity, an acceleration, an angular velocity, and an angular acceleration of this sensor apparatus 10.

As depicted in FIG. 2, the sensor apparatus 10 includes a processor 20, a storage section 22, a communication section 24, and a sensor section 26.

The processor 20 is a program-controlled device such as a CPU (Central Processing Unit) operating in accordance with programs installed in the sensor apparatus 10, for example. The storage section 22 is a storage element such as a ROM (Read Only Memory) or a RAM (Random Access Memory), or a hard disk drive, for example. The storage section 22 stores, among others, the programs executed by the processor 20. The communication section 24 is a communication interface such as a wireless LAN (Local Area Network) module.

The sensor section 26 is a device that includes one or multiple types of sensors such as a camera, an inertial sensor (IMU (Inertial Measurement Unit)), a geomagnetic sensor (direction sensor), an acceleration sensor, a motion sensor, or a GPS (Global Positioning System) module. The sensor section 26 generates measurement data indicating at least one from among a position, an orientation, a velocity, an acceleration, an angular velocity, and an angular acceleration of the sensor section 26.

The measurement data collection apparatus 12 in the present embodiment is a computer system including a personal computer, for example. As depicted in FIG. 1, the measurement data collection apparatus 12 includes a processor 12a, a storage section 12b, and a communication section 12c, for example.

The processor 12a is a program-controlled device such as a CPU operating in accordance with programs installed in the measurement data collection apparatus 12. The storage section 12b is a storage element such as a ROM or a RAM, or a hard disk drive, for example. The storage section 12b stores, among others, the programs executed by the processor 12a. The communication section 12c is a communication interface such as a network board or a wireless LAN module.

Figure 3:
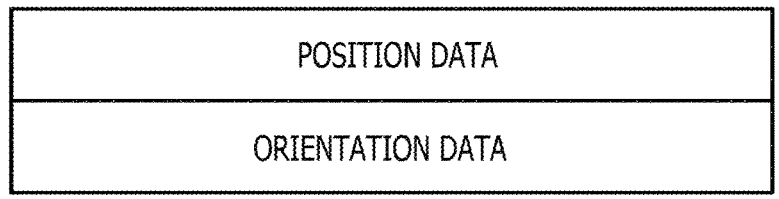
FIG. 3 is a view depicting a typical data structure of measurement data according to the embodiment of the present invention.

FIG. 3 is a view depicting a typical data structure of measurement data generated by the sensor section 26 in the present embodiment, the measurement data being indicative of the position and the orientation of the sensor section 26. As depicted in FIG. 3, the measurement data in the present embodiment includes position data indicating the position of the sensor section 26 and orientation data indicating the orientation of the sensor section 26.

Set here as the position data values are, for example, three-dimensional coordinates expressing the position of the sensor section 26 in a coordinate system preset for the sensor section 26.

Set as the orientation data values are, for example, quaternion values or rotation matrix values expressing the orientation of the sensor section 26 relative to a reference direction of the coordinate system preset for the sensor section 26.

The measurement data may include either the position data or the orientation data. The measurement data may further include velocity data indicating the velocity of the sensor section 26, acceleration data indicating the acceleration of the sensor section 26, angular velocity data indicating the angular velocity of the sensor section 26, and angular acceleration data indicating the angular acceleration of the sensor section 26, for example.

Figure 4:
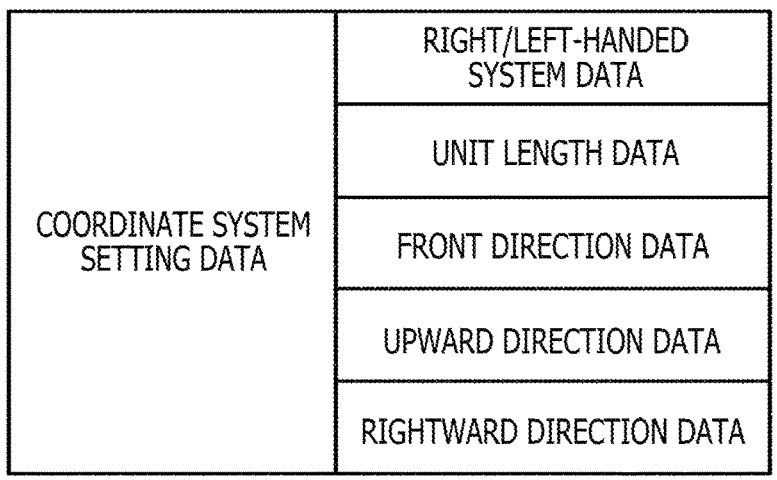
FIG. 4 is a view depicting a typical data structure of coordinate system setting data according to the embodiment of the present invention.

FIG. 4 is a view depicting a typical data structure of coordinate system setting data according to the present embodiment. The coordinate system setting data indicates settings for a coordinate system used for expressing at least one from among the position, the orientation, the velocity, the acceleration, the angular velocity, and the angular acceleration indicated by measurement data.

As depicted in FIG. 4, the coordinate system setting data includes right/left-handed system data indicating whether the coordinate system is a right-handed system or a left-handed system, for example. Here, in a case where the coordinate system is a right-handed system, either RIGHT_HAND or 1 may be set as the right/left-handed system data value. In a case where the coordinate system is a left-handed system, either LEFT_HAND or 2 may be set as the right/left-handed system data value. In a case where there is no need to convert the coordinate system, either NO_CONVERT or 3 may be set as the right/left-handed system data value.

The coordinate system setting data also includes unit length data indicating a unit of length in the measurement data, for example. Here, in a case where the position indicated by the measurement data is expressed in units of millimeters, either MM or 0 may be set as the unit length data value. In a case where the position indicated by the measurement data is expressed in units of centimeters, either CM or 1 may be set as the unit length data value. In a case where the position indicated by the measurement data is expressed in units of meters, either M or 2 may be set as the unit length data value. In a case where the position indicated by the measurement data is expressed in units of kilometers, either KM or 3 may be set as the unit length data value. In a case where the position indicated by the measurement data is expressed in units of feet, either FT or 4 may be set as the unit length data value. In a case where the position indicated by the measurement data is expressed in units of miles, either MI or 5 may be set as the unit length data value.

The coordinate system setting data also includes front direction data indicating an axis to which a front direction corresponds, upward direction data indicating an axis to which an upward direction corresponds, and rightward direction data indicating an axis to which a rightward direction corresponds relative to the front direction.

Here, in a case where the front direction corresponds to an X-axis positive direction, either X_PLUS or 1 is set as the front direction data value. In a case where the front direction corresponds to an X-axis negative direction, either X_MINUS or −1 is set as the front direction data value. In a case where the front direction corresponds to a Y-axis positive direction, either Y_PLUS or 2 is set as the front direction data value. In a case where the front direction corresponds to a Y-axis negative direction, either Y_MINUS or −2 is set as the front direction data value. In a case where the front direction corresponds to a Z-axis positive direction, either Z_PLUS or 3 is set as the front direction data value. In a case where the front direction corresponds to a Z-axis negative direction, either Z_MINUS or −3 is set as the front direction data value.

Further, in a case where the upward direction corresponds to the X-axis positive direction, either X_PLUS or 1 is set as the upward direction data value. In a case where the upward direction corresponds to the X-axis negative direction, either X_MINUS or −1 is set as the upward direction data value. In a case where the upward direction corresponds to the Y-axis positive direction, either Y_PLUS or 2 is set as the upward direction data value. In a case where the upward direction corresponds to the Y-axis negative direction, either Y_MINUS or −2 is set as the upward direction data value. In a case where the upward direction corresponds to the Z-axis positive direction, either Z_PLUS or 3 is set as the upward direction data value. In a case where the upward direction corresponds to the Z-axis negative direction, either Z_MINUS or −3 is set as the upward direction data value.

Also, in a case where the rightward direction relative to the front direction corresponds to the X-axis positive direction, either X_PLUS or 1 is set as the rightward direction data value. In a case where the rightward direction relative to the front direction corresponds to the X-axis negative direction, either X_MINUS or −1 is set as the rightward direction data value. In a case where the rightward direction relative to the front direction corresponds to the Y-axis positive direction, either Y_PLUS or 2 is set as the rightward direction data value. In a case where the rightward direction relative to the front direction corresponds to the Y-axis negative direction, either Y_MINUS or −2 is set as the rightward direction data value. In a case where the rightward direction relative to the front direction corresponds to the Z-axis positive direction, either Z_PLUS or 3 is set as the rightward direction data value. In a case where the rightward direction relative to the front direction corresponds to the Z-axis negative direction, either Z_MINUS or −3 is set as the rightward direction data value.

The storage section 22 of a given sensor apparatus 10, for example, stores beforehand the coordinate system setting data indicating the settings for a coordinate system used for expressing at least one from among the position, the orientation, the velocity, the acceleration, the angular velocity, and the angular acceleration indicated by the measurement data generated by the sensor section 26 of this sensor apparatus 10. At least one from among the position, the orientation, the velocity, the acceleration, the angular velocity, and the angular acceleration indicated by the measurement data may be variably expressed. In this case, the coordinate system setting data stored in the storage section 22 may be updated in keeping with the variable expression of at least one from among the position, the orientation, the velocity, the acceleration, the angular velocity, and the angular acceleration indicated by the measurement data.

The coordinate system setting data need not include all of the right/left-handed system data, unit length data, front direction data, upward direction data, and rightward direction data. The coordinate system setting data may include some from among the right/left-handed system data, unit length data, front direction data, upward direction data, and rightward direction data. For example, the rightward direction data value can be uniquely identified from the values of the right/left-handed system data, front direction data, and upward direction data. The upward direction data value can be uniquely identified from the values of the right/left-handed system data, front direction data, and rightward direction data. The front direction data value can be uniquely identified from the values of the right/left-handed system data, upward direction data, and rightward direction data. The right/left-handed system data value can be uniquely identified from the values of the front direction data, upward direction data, and rightward direction data.

Also, the coordinate system setting data may include data indicating settings for a coordinate system for expressing other than the right/left-handed system data, unit length data, front direction data, upward direction data, and rightward direction data.

Figure 5:
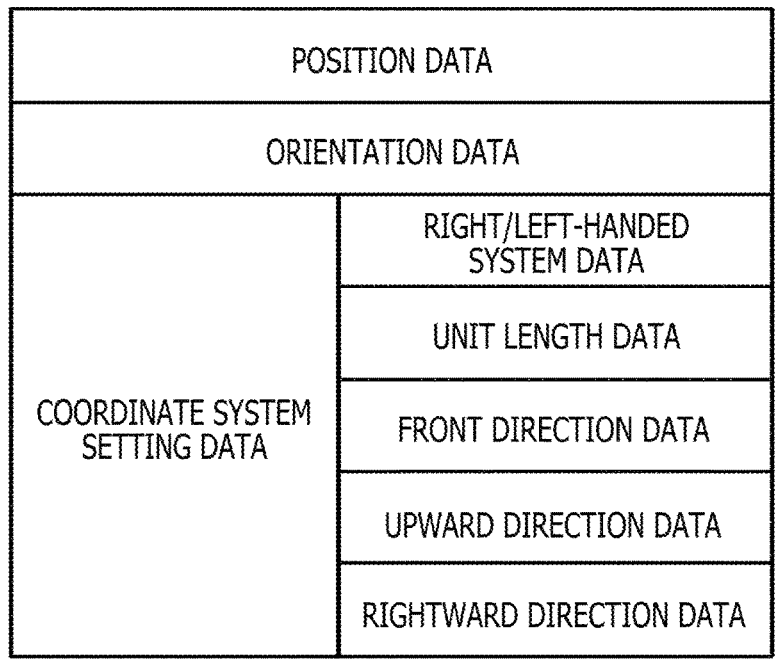
FIG. 5 is a view depicting a typical data structure of measurement data with settings according to the embodiment of the present invention.

FIG. 5 is a view depicting a typical data structure of measurement data with settings according to the present embodiment. With the present embodiment, in keeping with the measurement data generated by the sensor section 26 of the sensor apparatus 10, measurement data with settings is generated. As depicted in FIG. 5, the measurement data with settings includes the measurement data generated by the sensor section 26 of the sensor apparatus 10 and the coordinate system setting data stored in the storage section 22 of this sensor apparatus 10.

The generated measurement data with settings is then output. Here, the measurement data with settings is transmitted to the measurement data collection apparatus 12, for example.

In the present embodiment, for example, the sensor apparatus 10a transmits to the measurement data collection apparatus 12 the measurement data with settings including the measurement data indicating a result of measurement by the sensor section 26 in the sensor apparatus 10a and the coordinate system setting data stored in the storage section 22 of the sensor apparatus 10a. Likewise, the sensor apparatus 10b transmits to the measurement data collection apparatus 12 the measurement data with settings including the measurement data indicating a result of measurement by the sensor section 26 in the sensor apparatus 10b and the coordinate system setting data stored in the storage section 22 of the sensor apparatus 10b.

Also in the present embodiment, for example, on the basis of the measurement data with settings, the measurement data collection apparatus 12 performs operations such as those of identifying an overall arrangement of the multiple sensor apparatuses 10 and relative positions and relative orientations of the sensor apparatuses 10.

It may happen that the settings are not uniform for a coordinate system for expressing at least one from among the position, the orientation, the velocity, the acceleration, the angular velocity, and the angular acceleration indicated by the measurement data generated by the sensor section 26 included in each of the multiple sensor apparatuses 10. Also, the settings for the coordinate system may or may not be included in the measurement data.

In such cases, performing the above-mentioned operations requires unifying the coordinate systems for expressing at least one from among the position, the orientation, the velocity, the acceleration, the angular velocity, and the angular acceleration indicated by the measurement data collected from each of the multiple sensor apparatuses 10.

Here, a user finds it troublesome to reference specifications or other relevant documents to check the settings for the coordinate system for the measurement data. It is also troublesome to create a coordinate conversion program based on the checked coordinate system settings and execute the program in order to unify the coordinate systems.

In the present embodiment, as discussed above, the measurement data with settings includes the coordinate system setting data. Thus, with the present embodiment, referencing the coordinate system setting data included in the measurement data with settings allows the user easily to know the settings for the coordinate system for the measurement data indicating at least either the position or the orientation measured by the sensor section 26.

Explained further below are functions of the sensor apparatus 10 and the measurement data collection apparatus 12 according to the present embodiment.

Figure 6:
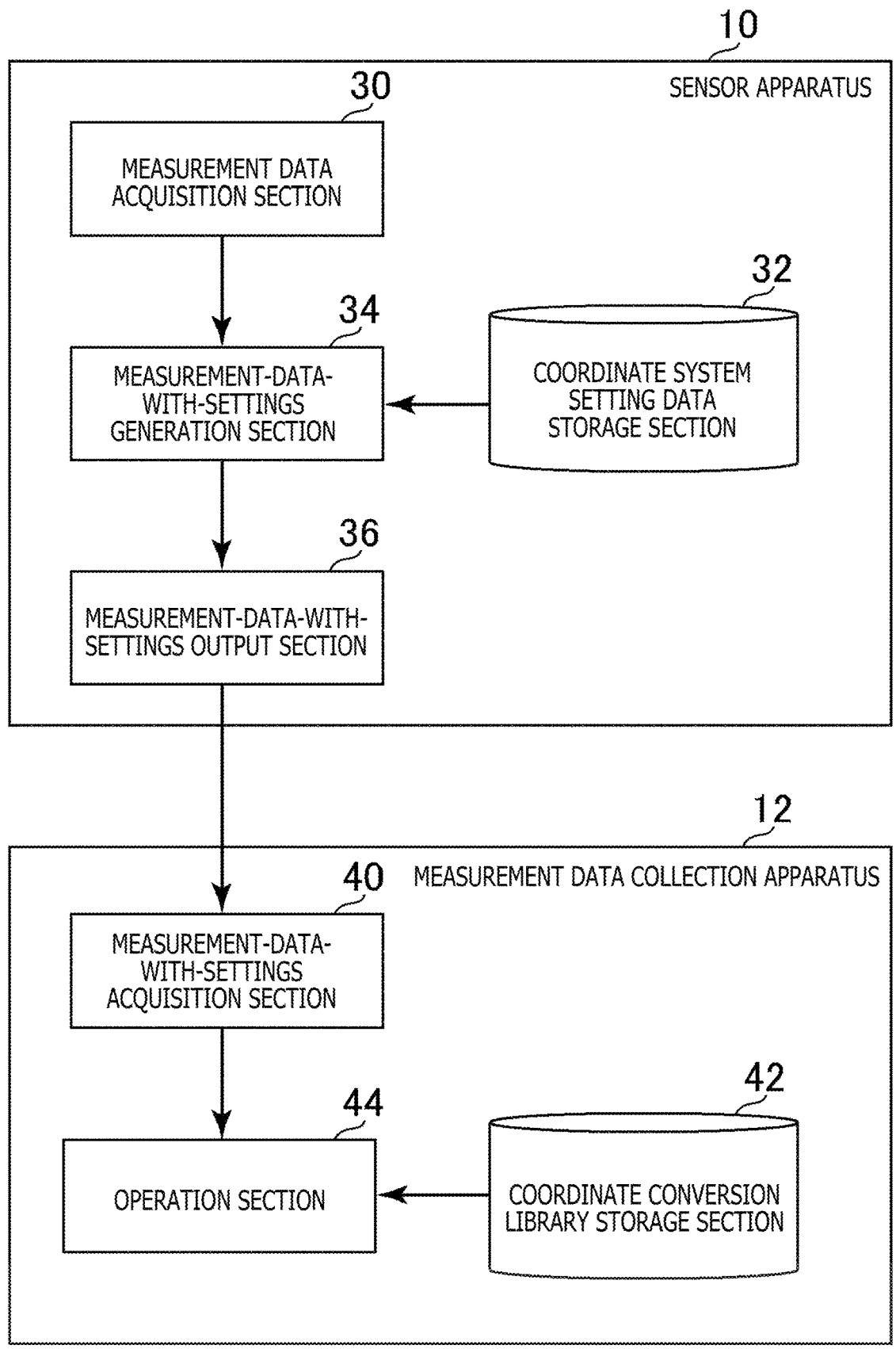
FIG. 6 is a functional block diagram depicting typical functions implemented by a sensor apparatus and a measurement data collection apparatus according to the embodiment of the present invention.

FIG. 6 is a functional block diagram depicting typical functions implemented by the sensor apparatus 10 and the measurement data collection apparatus 12 according to the present embodiment. It is to be noted that not all of the functions depicted in FIG. 6 need to be implemented by the sensor apparatus 10 and the measurement data collection apparatus 12 and that functions other than those illustrated in FIG. 6 may be implemented.

As depicted in FIG. 6, the sensor apparatus 10 according to the present embodiment functionally includes a measurement data acquisition section 30, a coordinate system setting data storage section 32, a measurement-data-with-settings generation section 34, and a measurement-data-with-settings output section 36, for example.

The measurement data acquisition section 30 is implemented using mainly the processor 20 and the sensor section 26. The coordinate system setting data storage section 32 is implemented using mainly the storage section 22. The measurement-data-with-settings generation section 34 is implemented using mainly the processor 20. The measurement-data-with-settings output section 36 is implemented using mainly the processor 20 and the communication section 24.

The above functions may also be implemented by the processor 20 executing a program that includes commands corresponding to the functions, the program being installed in the sensor apparatus 10 acting as a computer. The program may be supplied to the sensor apparatus 10 by means of a computer-readable information storage medium such as an optical disc, a magnetic disc, a magnetic tape, a magneto-optical disc, or a flash memory, or by way of the Internet.

As depicted in FIG. 6, the measurement data collection apparatus 12 in the present embodiment functionally includes a measurement-data-with-settings acquisition section 40, a coordinate conversion library storage section 42, and an operation section 44.

The measurement-data-with-settings acquisition section 40 is implemented using mainly the processor 12a and the communication section 12c. The coordinate conversion library storage section 42 is implemented using mainly the storage section 12b. The operation section 44 is implemented using mainly the processor 12a.

The above functions may also be implemented by the processor 12a executing a program that includes commands corresponding to the functions, the program being installed in the measurement data collection apparatus 12 acting as a computer. The program may be supplied to the measurement data collection apparatus 12 by means of a computer-readable information storage medium such as an optical disc, a magnetic disc, a magnetic tape, a magneto-optical disc, or a flash memory, or by way of the Internet.

The measurement data acquisition section 30 in the present embodiment acquires the measurement data indicating at least one from among the position, the orientation, the velocity, the acceleration, the angular velocity, and the angular acceleration measured by the sensor section 26, for example.

The coordinate system setting data storage section 32 in the present embodiment stores the coordinate system setting data indicating the settings for a coordinate system used for expressing at least one from among the position, the orientation, the velocity, the acceleration, the angular velocity, and the angular acceleration indicated by measurement data, for example. As discussed above, the coordinate system setting data may include at least one from among the data indicating the coordinate system being either a left-handed system or a right-handed system, the data indicating the front direction, and the data indicating the unit of length. Here, as explained above, the data indicating the front direction may include the front direction data indicating an axis direction to which the front direction corresponds, the upward direction data indicating an axis direction to which the upward direction corresponds, or the rightward direction data indicating an axis direction to which the rightward direction corresponds relative to the front direction.

The measurement-data-with-settings generation section 34 in the present embodiment generates the measurement data with settings including the measurement data and the coordinate system setting data, for example. Here, the measurement-data-with-settings generation section 34 generates the measurement data with settings including the measurement data acquired by the measurement data acquisition section 30 and the coordinate system setting data stored in the coordinate system setting data storage section 32, for example.

The measurement-data-with-settings output section 36 in the present embodiment outputs the measurement data with settings, for example. Here, the measurement-data-with-settings output section 36 transmits the measurement data with settings generated by the measurement-data-with-settings generation section 34 to the measurement data collection apparatus 12, for example.

The measurement-data-with-settings acquisition section 40 in the present embodiment acquires the measurement data with settings output from the sensor apparatus 10, for example.

Here, the measurement-data-with-settings acquisition section 40 receives the measurement data with settings transmitted from the sensor apparatus 10a, for example. In the description that follows, this measurement data with settings will be referred to as the first measurement data with settings. The first measurement data with settings includes the measurement data indicating at least one from among the position, the orientation, the velocity, the acceleration, the angular velocity, and the angular acceleration measured by the sensor section 26 in the sensor apparatus 10a. In the ensuing description, this measurement data will be referred to as the first measurement data. The first measurement data with settings also includes the coordinate system setting data indicating the settings for a coordinate system used for expressing at least one from among the position, the orientation, the velocity, the acceleration, the angular velocity, and the angular acceleration indicated by the first measurement data. In the description that follows, this coordinate system setting data will be referred to as the first coordinate system setting data indicating the settings for a first coordinate system.

Also, the measurement-data-with-settings acquisition section 40 receives the measurement data with settings transmitted from the sensor apparatus 10b. In the description that follows, this measurement data with settings will be referred to as the second measurement data with settings. The second measurement data with settings includes the measurement data indicating at least one from among the position, the orientation, the velocity, the acceleration, the angular velocity, and the angular acceleration measured by the sensor section 26 in the sensor apparatus 10b. In the ensuing description, this measurement data will be referred to as the second measurement data. The second measurement data with settings also includes the coordinate system setting data indicating the settings for a coordinate system used for expressing at least one from among the position, the orientation, the velocity, the acceleration, the angular velocity, and the angular acceleration indicated by the second measurement data. In the description that follows, this coordinate system setting data will be referred to as the second coordinate system setting data indicating the settings for a second coordinate system.

The coordinate conversion library storage section 42 in the present embodiment stores a library program for coordinate conversion for use in processes performed by the operation section 44, for example.

The operation section 44 in the present embodiment performs operations such as those of identifying the overall arrangement of multiple sensor apparatuses 10 and the relative positions and the relative orientations of the sensor apparatuses 10, for example. Here, the above operations are carried out on the basis of the first measurement data with settings and the second measurement data with settings, for example.

Also, as part of such operations, the operation section 44 may perform the operation of coordinate conversion for converting the expression of at least one from among the position, the orientation, the velocity, the acceleration, the angular velocity, and the angular acceleration indicated by the measurement data included in the measurement data with settings, into an expression in another coordinate system. Here, on the basis of the settings for the above-mentioned first coordinate system and those for the above-mentioned second coordinate system, the operation section 44 may perform the operation of coordinate conversion for converting the expression of at least one from among the position, the orientation, the velocity, the acceleration, the angular velocity, and the angular acceleration indicated by the first measurement data into an expression in the second coordinate system, for example.

In another example, on the basis of the settings for the above-mentioned first coordinate system and settings for a given third coordinate system different from the first or the second coordinate system, coordinate conversion may be carried out to convert the expression of at least one from among the position, the orientation, the velocity, the acceleration, the angular velocity, and the angular acceleration indicated by the first measurement data into an expression in the third coordinate system. Also, on the basis of the settings for the above-mentioned second coordinate system and those for the given third coordinate system, the operation of coordinate conversion may be performed to convert the expression of at least one from among the position, the orientation, the velocity, the acceleration, the angular velocity, and the angular acceleration indicated by the second measurement data into an expression in the third coordinate system.

FIG. 7 is a view depicting a typical source code of a program related to the above-mentioned operation of coordinate conversion carried out by the operation section 44. Commands employed in this program are implemented using the library program stored in the coordinate conversion library storage section 42, for example.

In the example of FIG. 7, command (1) is a command that sets values of the first coordinate system setting data in a value field cs_in. Here, for example, an argument a1 is set with the right/left-handed system data value included in the first coordinate system setting data. An argument a2 is set with the unit length data value included in the first coordinate system setting data. An argument a3 is set with the front direction data value included in the first coordinate system setting data. An argument a4 is set with the upward direction data value included in the first coordinate system setting data. An argument a5 is set with the rightward direction data value included in the first coordinate system setting data.

Command (2) is a command that sets a value field p_in with the values of the first coordinate system setting data and those of the position data included in the first measurement data. Here, an argument (px, py, pz) is set with the position data values included in the first measurement data, for example.

Command (3) is a command that sets a value field q_in with the values of the first coordinate system setting data and those of the orientation data included in the first measurement data. Here, an argument (qx, qy, qz, qw) is set with the orientation data values included in the first measurement data, for example.

Command (4) is a command that sets a value field cs_out with the values of the second coordinate system setting data. Here, an argument b1 is set with the right/left-handed system data value included in the second coordinate system setting data, for example. An argument b2 is set with the unit length data value included in the second coordinate system setting data. An argument b3 is set with the front direction data value included in the second coordinate system setting data. An argument b4 is set with the upward direction data value included in the second coordinate system setting data. An argument b5 is set with the rightward direction data value included in the second coordinate system setting data.

Command (5) is a command that executes the operation of coordinate conversion for converting the expression of the position indicated by the first measurement data into an expression in the second coordinate system. A value field p_out is set with the position indicated by the first measurement data in the value field p_in and converted into an expression in the second coordinate system.

Command (6) is a command that executes the operation of coordinate conversion for converting the expression of the orientation indicated by the first measurement data into an expression in the second coordinate system. A value field q_out is set with the orientation indicated by the first measurement data in the value field q_in and converted into an expression in the second coordinate system.

Thereafter, various operations based on the expressions in the second coordinate system can be performed according to the values in the value fields p_out and q_out and the second measurement data.

Here, the command "convert" indicated by commands (5) and (6) may be implemented by performing a process of switching the X-, Y- and Z-axes and a process of inverting the sign of each of the axes multiple times.

Figure 8:
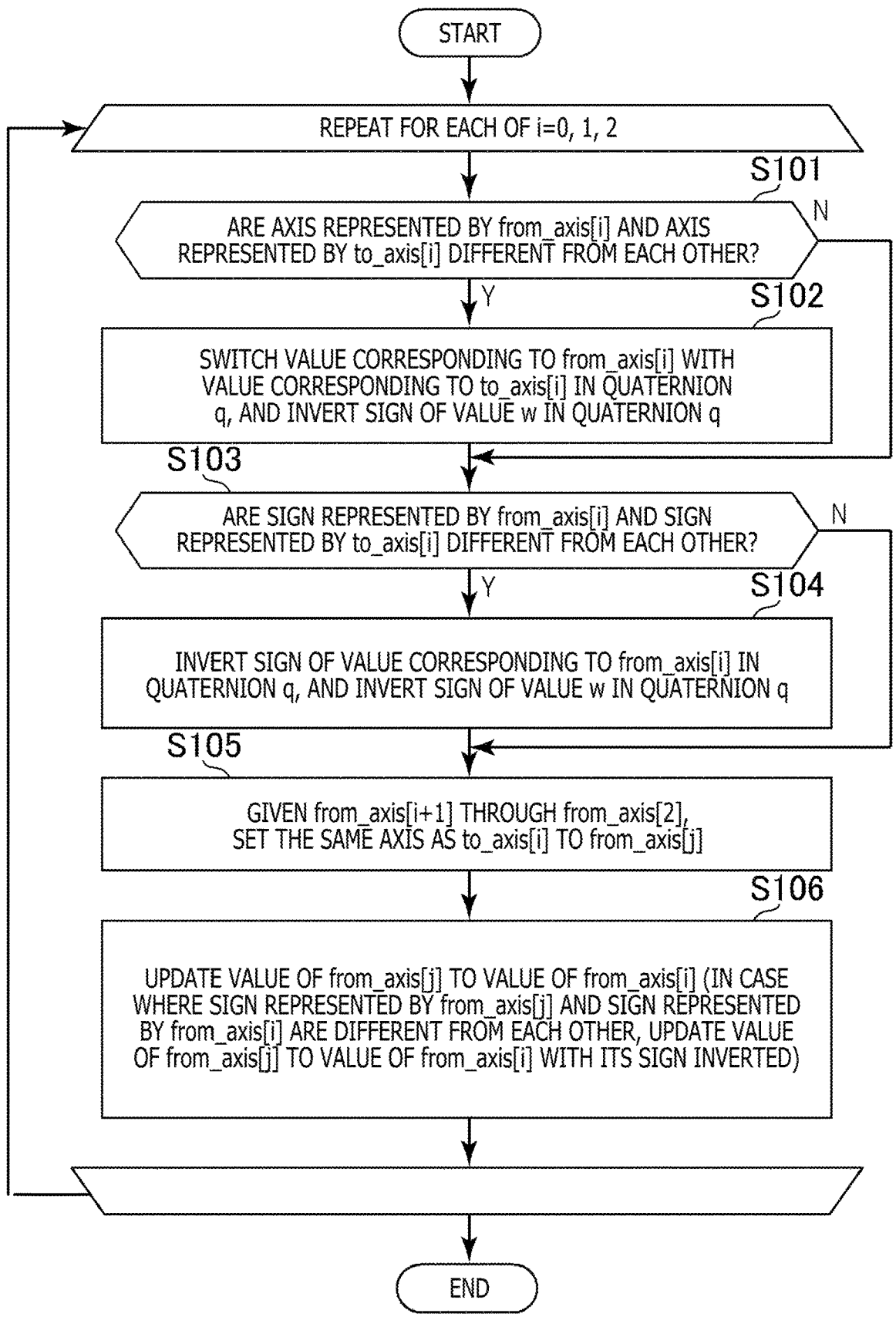
FIG. 8 is a flowchart depicting a typical flow of processing executed with a command "convert."

FIG. 8 is a flowchart depicting a typical flow of processing executed with the command "convert." What is depicted in FIG. 8 is an example of processing of converting a quaternion q from the expression in the first coordinate system into the expression in the second coordinate system.

In the ensuing description, it is assumed that from_axis [0], from_axis[1], and from_axis[2] indicate the axis directions to which the front direction, the upward direction, and the rightward direction relative to the front direction correspond respectively in the first coordinate system. Here, for example, from_axis[0], from_axis[1], and from_axis[2] may denote the front direction data value, the upward direction data value, and the rightward direction data value included in the first coordinate system setting data.

It is also assumed that to_axis[0], to_axis[1], and to_axis [2] indicate the axis directions to which the front direction, the upward direction, and the rightward direction relative to the front direction correspond respectively in the second coordinate system. Here, for example, to_axis[0], to_axis [1], and to_axis[2] may denote the front direction data value, the upward direction data value, and the rightward direction data value included in the second coordinate system setting data.

In the processing depicted in FIG. 8, processes indicated by S101 through S106 are repeated for each of a variable i being 0, 1 and 2.

First, the operation section 44 determines whether or not the axis represented by from_axis[i] and the axis represented by to_axis[i] are different from each other (S101). In the process of S101, if the axis represented by from_axis[i] and the axis represented by to_axis[i] are identical as one of the X-, Y- and Z-axes regardless of their signs, the two axes are determined to be the same.

Here, suppose that the axis represented by from_axis[i] and the axis represented by to_axis[i] are determined to be different from each other (S101: Y). In this case, the operation section 44 switches the value corresponding to from_axis[i] with the value corresponding to to_axis[i] included in the quaternion q, and inverts the sign of the value of w included in the quaternion q (S102).

Suppose that the axis represented by from_axis[i] and the axis represented by to_axis[i] are determined to be the same in the process of S101 (S101: N) or that the process of S102 is terminated. In this case, the operation section 44 determines whether or not the sign represented by from_axis[i] and the sign represented by to_axis[i] are different from each other (S103).

Here, suppose that the sign represented by from_axis[i] and the sign represented by to_axis[i] are different from each other (S103: Y). In this case, the operation section 44 inverts the sign corresponding to from_axis[i] in the quaternion q and the sign of the value of w in the quaternion q (S104).

Suppose that the sign represented by from_axis[i] and the sign represented by to_axis[i] are determined to be the same in the process of S103 (S103: N) or that the process of S104 is terminated. In this case, given from_axis[i+1] through from_axis[2], the operation section 44 sets the same axis as to_axis[i] to from_axis[j] (S105).

Then, the operation section 44 updates the value of from_axis[j] to the value of from_axis[i] (S106). In a case where the sign represented by from_axis[j] and the sign represented by from_axis[i] are different from each other in the process of S106, the operation section 44 updates the value of from_axis[j] to the value of from_axis[i] with its sign inverted.

After the processes of S101 through S106 have been performed for each of the variable i being 0, 1 and 2, the processing of the present processing example is terminated.

A specific example of the processing depicted in FIG. 8 is explained below with reference to FIG. 9. Here, as indicated by (1) in FIG. 9, it is assumed that the values of the quaternion q are (0, 0.33, 0.55, 0.77). It is also assumed that the values of from_axis[0], from_axis[1], and from_axis[2] are X_MINUS, Y_PLUS, and Z_MINUS, respectively. In this case, the first coordinate system is a right-handed system. It is further assumed that the values of to_axis[0], to_axis[1], and to_axis[2] are Y_MINUS, Z_PLUS, and X_PLUS, respectively. In this case, the second coordinate system is a left-handed system.

In this case, first in the process of S102 in which the variable i is 0, the values of the quaternion q are updated to (0.33, 0, 0.55, −0.77) as indicated by (2) in FIG. 9. Here, the axis represented by from_axis[0] (X_MINUS) is the X-axis and the axis represented by to_axis[0] (Y_MINUS) is the Y-axis. For this reason, the values of x and y are switched and the sign of the value of w is inverted in the quaternion q.

Then, in the process of S106 in which the variable i is 0, the value (Y_PLUS) of from_axis[1] is updated to X_PLUS as indicated by (3) in FIG. 9. This is because the axis represented by from_axis[1] (Y_PLUS) and the axis represented by to_axis[0] (Y_MINUS) are both the Y-axis. Because the sign represented by from_axis[1] (Y_PLUS) and the sign represented by from_axis[0] (X_MINUS) are different from each other, the value of from_axis[1] is updated to X_PLUS, which is the inverted sign of from_axis[0] (X_MINUS).

Then, in the process of S102 in which the variable i is 1, the values of the quaternion q are updated to (0.55, 0, 0.33, 0.77) as indicated by (4) in FIG. 9. Here, the axis represented by from_axis[1] (X_PLUS) is the X-axis and the axis represented by to_axis[1] (Z_PLUS) is the Z-axis. For this reason, the values of x and z are switched and the sign of the value of w is inverted in the quaternion q.

Then, in the process of S106 in which the variable i is 1, the value (Z_MINUS) of from_axis[2] is updated to X_MINUS as indicated by (5) in FIG. 9. This is because the axis represented by from_axis[2] (Z_MINUS) and the axis represented by to_axis[1] (Z_PLUS) are both the Z-axis. Because the sign represented by from_axis[2] (X_MINUS) and the sign represented by from_axis[1] (X_PLUS) are different from each other, the value of from_axis[2] is updated to X_MINUS, which is the inverted sign of from_axis[1] (X_PLUS).

Then, in the process of S104 in which the variable i is 2, the values of the quaternion q are updated to (−0.55, 0, 0.33, −0.77) as indicated by (6) in FIG. 9. Because the sign represented by from_axis[2] (X_MINUS) and the sign represented by to_axis[2] (X_PLUS) are different from each other, the signs of the values of x and w are each inverted in the quaternion q.

In the manner described above, the quaternion q is converted into the expression (−0.55, 0, 0.33, −0.77) in the second coordinate system.

As described above, the command "convert" may be implemented by performing the process of switching the X-, Y- and Z-axes and the process of inverting the sign of each of the axes multiple times.

Explained above is the example in which the process of switching the axes and the process of inverting the sign of each of the axes are carried out multiple times in order to convert the orientation indicated by the measurement data included in the measurement data with settings from the expression in the first coordinate system into the expression in the second coordinate system. Likewise, the process of switching the axes and the process of inverting the sign of each of the axes may be performed multiple times to convert the position, the velocity, the acceleration, the angular velocity, and the angular acceleration besides the orientation from the expression in the first coordinate system into the expression in the second coordinate system.

Further, basic vector operations and rotation operations may be implemented through the use of the library program stored in the coordinate conversion library storage section 42. Using the library program eliminates the need for bothering to code complicated programs for coordinate conversion. Also, there is no need to carry out coordinate conversion many times. Furthermore, readability of source code is improved.

It is to be noted that the present invention is not limited to the above-described embodiment.

For example, the measurement data with settings may include a single item of coordinate setting data and multiple items of measurement data, each data item indicating at least one from among the position, the orientation, the velocity, the acceleration, the angular velocity, and the angular acceleration measured at mutually different timings. Also, the measurement data may include, for example, timestamps indicating the timing at which at least one from among the position, the orientation, the velocity, the acceleration, the angular velocity, and the angular acceleration has been measured. Further, once a given sensor apparatus 10 has transmitted the measurement data with settings, this sensor apparatus 10 may be arranged to transmit measurement data excluding the coordinate system setting data.

Given that the upward direction for some devices does not match the upward direction of gravity, the coordinate system setting data may include data indicating the axis directions to which the front direction and the upward direction correspond or the axis directions to which the front direction and the direction of gravity correspond in an initial orientation of the device. Alternatively, the coordinate system setting data may include data indicating an axis direction corresponding to a given point of the compass, such as north data indicating an axis direction corresponding to the northward direction. In this manner, the data included in the coordinate system setting data and indicative of the front direction may include either the data indicating the axis direction corresponding to the direction of gravity or the data indicating the axis direction corresponding to a given point of the compass.

As another alternative, the values of the coordinate system setting data may be expressed not by axis names and signs but by three-dimensional coordinate values of unit vectors.

It is also to be noted that specific character strings and numerical values in the foregoing description as well as in the accompanying drawings are only examples and are not limitative of the present invention.

The invention claimed is:

1. An information processing apparatus comprising:
a first measurement-data-with-settings acquisition section configured to acquire first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings;
a second measurement-data-with-settings acquisition section configured to acquire second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and
a coordinate conversion section configured such that, on a basis of the settings for the first coordinate system indicated by the first coordinate system setting data included in the first measurement data with settings and the settings for the second coordinate system indicated by the second coordinate system setting data included in the second measurement data with settings, the coordinate conversion section converts an expression of at least one from among the position, the orientation, the velocity, the acceleration, the angular velocity, and the angular acceleration indicated by the first measurement data included in the first measurement data with settings, into an expression in the second coordinate system,
wherein the coordinate conversion section performs a process of switching axes and a process of inverting a sign of each of the axes multiple times so as to convert an expression of at least one from among the position, the orientation, the velocity, the acceleration, the angular velocity, and the angular acceleration indicated by the first measurement data included in the first measurement data with settings, into an expression in the second coordinate system.

2. The information processing apparatus according to claim 1, wherein the coordinate system setting data includes at least one of three items of data, one item of data indicating whether the coordinate system is a right-handed system or a left-handed system, another item of data indicating a front direction, the other item of data indicating a unit of length.

3. The information processing apparatus according to claim 2, wherein the item of data indicating the front direction includes data indicating an axis direction to which the front direction corresponds, data indicating an axis direction to which an upward direction corresponds, data indicating an axis direction to which a rightward direction relative to the front direction corresponds, data indicating an axis direction to which a direction of gravity corresponds, or data indicating an axis direction to which a point of compass corresponds.

4. The information processing apparatus according to claim 1, wherein the coordinate conversion section performs a process of switching axes and a process of inverting a sign of each of the axes multiple times so as to convert an expression of at least one from among the position, the orientation, the velocity, the acceleration, the angular velocity, and the angular acceleration indicated by the measurement data included in the measurement data with settings, into an expression in the second coordinate system.

5. An information processing method comprising:
acquiring first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings;
acquiring second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and on a basis of the settings for the first coordinate system indicated by the first coordinate system setting data included in the first measurement data with settings and the settings for the second coordinate system indicated by the second coordinate system setting data included in the second measurement data with settings, converting an expression of at least one from among the position, the orientation, the velocity, the acceleration, the angular velocity, and the angular acceleration indicated by the first measurement data included in the first measurement data with settings, into an expression in the second coordinate system, wherein the converting includes a process of switching axes and a process of inverting a sign of each of the axes multiple times so as to convert an expression of at least one from among the position, the orientation, the velocity, the acceleration, the angular velocity, and the angular acceleration indicated by the first measurement data included in the first measurement data with settings, into an expression in the second coordinate system.

6. A non-transitory, computer readable storage medium containing a program, which when executed by a computer, causes the computer to carry out actions, comprising:

acquiring first measurement data with settings output from a first sensor apparatus that includes a first measurement data acquisition section configured to acquire first measurement data indicating at least one from among a position, an orientation, a velocity, an acceleration, an angular velocity, and an angular acceleration measured by a first sensor, a first generation section configured to generate the first measurement data with settings including the first measurement data and first coordinate system setting data indicating settings for a first coordinate system used for expressing at least one from among the position, the orientation, the velocity, the acceleration, the angular velocity, and the angular acceleration indicated by the first measurement data, and a first output section configured to output the first measurement data with settings;

acquiring second measurement data with settings output from a second sensor apparatus that includes a second measurement data acquisition section configured to acquire second measurement data indicating at least one from among a position, an orientation, a velocity, an acceleration, an angular velocity, and an angular acceleration measured by a second sensor, a second generation section configured to generate the second measurement data with settings including the second measurement data and second coordinate system setting data indicating settings for a second coordinate system used for expressing at least one from among the position, the orientation, the velocity, the acceleration, the angular velocity, and the angular acceleration indicated by the second measurement data, and a second output section configured to output the second measurement data with settings; and on a basis of the settings for the first coordinate system indicated by the first coordinate system setting data included in the first measurement data with settings and the settings for the second coordinate system indicated by the second coordinate system setting data included in the second measurement data with settings, converting an expression of at least one from among the position, the orientation, the velocity, the acceleration, the angular velocity, and the angular acceleration indicated by the first measurement data included in the first measurement data with settings, into an expression in the second coordinate system, wherein the converting includes a process of switching axes and a process of inverting a sign of each of the axes multiple times so as to convert an expression of at least one from among the position, the orientation, the velocity, the acceleration, the angular velocity, and the angular acceleration indicated by the first measurement data included in the first measurement data with settings, into an expression in the second coordinate system.

* * * * *